United States Patent [19]

Spranger

[11] 4,261,829
[45] Apr. 14, 1981

[54] APPARATUS FOR SELECTIVE SEPARATION OF MATTER THROUGH SEMI-PERMEABLE MEMBRANES

[75] Inventor: Kurt Spranger, Ammerbuch-Entingen, Fed. Rep. of Germany

[73] Assignee: Gambro Dialysatoren GmbH & Co. KG, Fed. Rep. of Germany

[21] Appl. No.: 951,312

[22] Filed: Oct. 13, 1978

[30] Foreign Application Priority Data

Oct. 17, 1977 [SE] Sweden .................................. 7711632

[51] Int. Cl.³ ........................ B01D 13/00; B01D 31/00
[52] U.S. Cl. .................................. 210/321.1; 210/456; 210/433.2; 210/323.2; 55/158
[58] Field of Search ........................... 55/158; 165/158; 210/321 A, 321 B, 321 R, 323 T, 433 M, 456; 422/48

[56] References Cited

U.S. PATENT DOCUMENTS

| | | | |
|---|---|---|---|
| 3,211,645 | 10/1965 | Ferrari | 210/321 A |
| 3,342,729 | 9/1967 | Strand | 210/321 |
| 3,485,374 | 12/1969 | Mangikien et al. | 210/433 M |
| 3,728,256 | 4/1973 | Cooper | 210/23 F |
| 3,734,298 | 5/1973 | Riede et al. | 210/321 |
| 3,993,816 | 11/1976 | Bandet et al. | 210/22 R |
| 4,016,082 | 4/1977 | Riede et al. | 210/431 B |
| 4,038,190 | 7/1977 | Bandet et al. | 210/321 B |
| 4,038,191 | 7/1977 | Davis et al. | 210/321 B |
| 4,039,455 | 8/1977 | Bardn et al. | 210/321 A |
| 4,054,527 | 10/1977 | Edmond | 210/321 B |
| 4,127,481 | 11/1978 | Malchesky | 210/321 R |

FOREIGN PATENT DOCUMENTS

| | | | |
|---|---|---|---|
| 2514763 | 10/1975 | Fed. Rep. of Germany | 210/321 A |
| 7309752 | 10/1974 | France | 210/433 M |
| 393535 | 8/1977 | Sweden | 210/321 B |

Primary Examiner—Thomas G. Wiseman
Assistant Examiner—E. Indlons Cross
Attorney, Agent, or Firm—Lerner, David, Littenberg & Samuel

[57] ABSTRACT

Apparatus for selective separation of matter between a first fluid and a second fluid through semi-permeable membranes. The apparatus comprises a plurality of separate frame assemblies each of which defines a separate contact chamber for the second fluid. A plurality of tubular semi-permeable membranes for the first fluid are supported in each of the contact chambers of the separate frame assemblies so that the second fluid will substantially surround the tubular membranes as it passes through such contact chambers. The plurality of frame assemblies are clamped together in stacked relationship so that the contact chambers are arranged in side by side relationship. Sealing means are provided for sealing the tubular membranes from the contact chambers so that there is no contact between the first fluid and the second fluid. Further, each of the frame assemblies is provided with communication means for providing fluid communication for the second fluid between the contact chambers of each of the frame assemblies. A portion of the first fluid is adapted to be introduced into each of the tubular membranes through separate first inlet means and is adapted to be withdrawn therefrom through separate first outlet means. The second fluid is adapted to be introduced into at least one of the contact chambers through separate second inlet means and is adapted to be withdrawn from another of the contact chambers through separate second outlet means so that the second fluid is conducted substantially throughout the contact chambers in contact with the pluralities of tubular membrane to selectively separate the matter between the first and second fluids.

19 Claims, 5 Drawing Figures

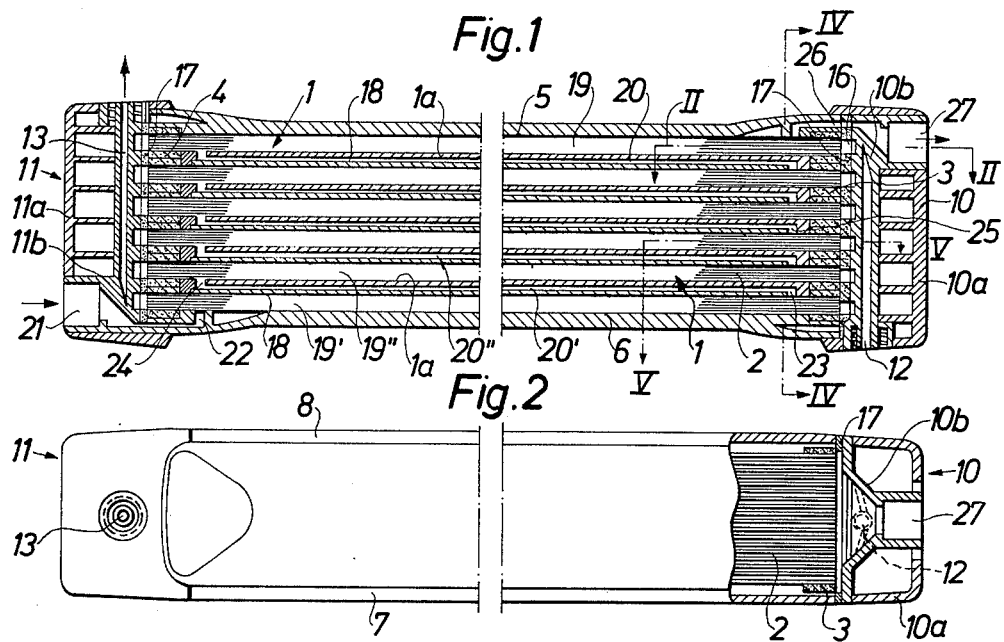
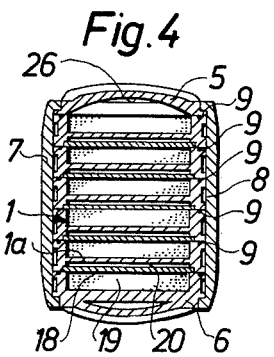
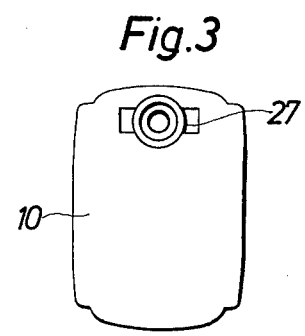
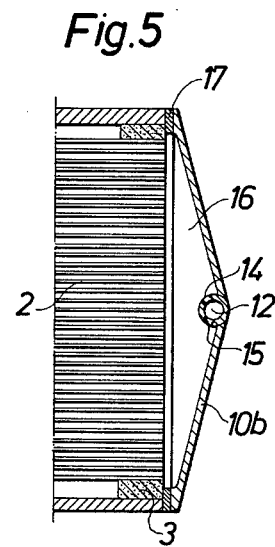

APPARATUS FOR SELECTIVE SEPARATION OF MATTER THROUGH SEMI-PERMEABLE MEMBRANES

BACKGROUND OF THE INVENTION

The present invention relates generally to apparatus for selectively separating matter between two fluids utilizing semi-permeable membranes, and more particularly, to apparatus in which the membranes have the shape of thin walled tubes through which one of the fluids is intended to flow. Still more particularly, the present invention relates to such an apparatus in which the tubes are surrounded on their outer surface by the other fluid, and in which collective inlets and outlets are provided for the respective fluids.

It has been known in the past to utilize semi-permeable membrances to facilitate the diffusion and/or filtration of matter between two fluids therethrough. For example, such membranes are particularly useful in artificial kidney devices for blood purification, as well as in diafiltration and ultrafiltration devices. From patents such as U.S. Pat. Nos. 3,728,256 and 4,038,190 as well as other patents, it is known to utilize arrangements in which a plurality of tubular semi-permeable membrances are provided in two or more separate chambers connected to one another. In such arrangements, the first fluid passes through the semi-permeable membranes and the second fluid is arranged to pass through the separate chambers around the outer surface of the tubular membranes to selectively separate the matter between the first fluid and the second fluid through the membranes.

The search has, however, continued for improved devices for selective separation of matter between fluids. In particular, the search has continued for such devices which are suitable for mass production while at the same time maintain and/or improve the good flow conditions of the respective fluids which are characteristic of such known devices.

SUMMARY OF THE INVENTION

In accordance with the present invention, these and other objects are achieved by providing an apparatus for the selective separation of matter between a first fluid and a second fluid through semi-permeable membranes. In particular, the apparatus of the present invention comprises a plurality of separate frame assemblies each of which defines a separate contact chamber for the second fluid. A plurality of tubular semi-permeable membranes for the first fluid are disposed in each of the contact chambers of the separate frame assemblies so that the second fluid will substantially surround the tubular membranes as it passes through the contact chambers. The apparatus further includes means for clamping the plurality of separate frame assemblies together in stacked relationship so that the contact chambers thereof are arranged in side by side relationship. Sealing means are provided for the stacked frame assemblies for sealing the tubular membranes from the contact chambers so that there is no contact between the first fluid and the second fluid. Each of the frame assemblies is provided with communication means for providing fluid communication for the second fluid between the contact chambers of the separate frame assemblies so that the second fluid is conducted substantially throughout all of the contact chambers. The first fluid is adapted to be introduced into the tubular membranes through separate first inlet means and is adapted to be withdrawn therefrom through separate first outlet means. The second fluid is introduced into at least one of the contact chambers through second inlet means and is withdrawn from one of the contact chambers through separate second outlet means after having been conducted through the contact chambers of the stacked frame assemblies in contact with the pluralities of tubular membranes to selectively separate the matter between the first and second fluids.

With such an apparatus, each of the frame assemblies and each of the pluralities of tubular membranes disposed in the contact chambers may be substantially identical and therefore suitable for mass production. At the same time, uniform and good flow conditions are achieved as a result of the fact that each of the frame asemblies and each of the tubular membranes are substantially identical, thereby providing similar flow paths therethrough for the first and second fluids. This substantial identity of components is also important in evenly distributing the first fluid through the respective pluralities of tubular membranes disposed in the separate frame assemblies.

In the preferred embodiment, the first fluid is adapted to flow through the tubular membranes in a direction from a first end of the contact chambers to a second, opposite end thereof. The communication means for each of the frame assemblies includes a barrier means which defines an intermediate flow channel between the contact chambers of adjacent frame assemblies. The barrier means includes flow openings at its opposite ends so that the second fluid is adapted to flow through each of the contact chambers in a direction from the second end to the first end, i.e., in a purely countercurrent direction to the flow of the first fluid through the tubular membranes, and is adapted to flow through the intermediate flow channels in a direction from the first end to the second end, i.e., in the direction of the flow of the first fluid through the tubular membranes. Such pure countercurrent flow of the second fluid while in contact with the tubular membranes carrying the first fluid is highly advantageous for providing improved selective separation of matter, as noted in copending U.S. patent application Ser. No. 713,408 filed Aug. 11, 1976.

In a further preferred embodiment, the barrier means is defined by a pair of intermediate walls, one of which is integrally formed on each of the frame assemblies and the other of which is disposed between adjacent frame assemblies in the stack of frame assemblies. The integrally formed wall includes an opening at the second end whereas the wall disposed between the adjacent frame assemblies includes an opening at the first end so that the second fluid, after having been conducted through the contact chamber from the second end to the first end, is directed into the intermediate flow channel and from there towards the second end where it is then introduced into the contact chamber of the adjacent frame assembly to achieve pure countercurrent flow of the second fluid across the tubular membranes in each of the contact chambers.

In another preferred embodiment, the apparatus includes first and second end fittings for the plurality of frame assemblies clamped in stacked relationship which end fittings house the respective inlets and outlets for the first and second fluids. For instance, the first inlet means for the first fluid and the second outlet means for the second fluid may be located in the first end fitting, and the first outlet means for the first fluid and the second inlet means for the second fluid are located in the second end fitting. Further, the first and second end fittings may be provided with distribution and collection means respectively for evenly dividing the first fluid between the plurality of membranes of the frame assemblies.

In a still further preferred embodiment, the sealing means comprise gaskets between each of the frame assemblies of the stacked frame assemblies. Further, the sealing means may comprise end gasket seals for each of the ends of each of the frame assemblies. The end gasket seals are disposed between the ends of the frame assemblies and the end fittings, and surround the open ends of the plurality of tubular membranes supported by the frame assemblies.

These and other advantages of the present invention will be apparent from the following detailed description in which reference is made to the enclosed drawings which illustrate the preferred embodiment of the present invention.

BRIEF DESCRIPTION OF THE DRAWINGS

FIG. 1 is a longitudinal sectional view of the apparatus in accordance with the present invention;

FIG. 2 is a top plan view of the apparatus of the present invention, partly in section along lines 2—2 of FIG. 1;

FIG. 3 is an end view of the apparatus of the present invention;

FIG. 4 is a sectional view taken along lines 4—4 of FIG. 1; and

FIG. 5 is a partial sectional view of the apparatus of the present invention taken along lines 5—5 of FIG. 1.

DETAILED DESCRIPTION OF THE PREFERRED EMBODIMENT

Turning now to the drawings in which like reference characters represent like elements, there is shown generaly an appratus for selective separation of matter through semi-permeable membranes. The apparatus in accordance with the present invention is intended mainly for use as an artificial kidney for obtaining blood purification. The present invention will therefore be described in the following with rerernce to such a use of the apparatus. However, it will be clear to those versed in the art that the construction of the apparatus of the present invention can also be used for processes other than the dialysis of patients suffering from kidney disease. For example, it may be used for similar processes such as diafiltration or ultrafiltration. With such other uses, one of the inlets for one of the fluids may be omitted if desired. Further still, the present invention may be used in connection with the treatment for failure of the liver, pancreas, and other organs. Still further, the apparatus in accordance with the present invention may be used as an oxygenizer wherein one of the fluids consists of blood while the other consists of oxygen or an oxygen mixture.

Accordingly, in the description herein, selective separation of matter is used to designate any of the processes referred to hereinabove, and in particular, to encompass the processes of diffusion, ultrafiltration, and/or diafiltration. Further, fluid is intended in its broad sense to encompass both gases as well as liquids.

As best seen in FIGS. 1 and 4, the apparatus according to the present invention is comprised of a number of frame assemblies 1 which are stacked one on top of the other. Each of the frame assemblies 1 is adapted to support a cluster or mass of thin walled tubes or fibers 2 in a contact chamber 19 defined by the frame assemblies 1. The thin walled tubes 2 are arranged in clusters with the ends thereof cast into blocks 3, 4 of sealing compound, such as for example polyurethane. The frame assemblies 1 are designed so that they retain these blocks 3, 4 of sealing compound at the opposite ends thereof with the tubes 2 extending therebetween. Preferably, the tubes or fibers 2 are placed in tension when supported in the frame assemblies 1. In this manner, the tension produced on the tubes 2 will serve to hold the individual tubes apart so that the fluid which is to be conducted through the contact chambers 19 will flow entirely around the perimeter or outer surface of each of the tubes 2. Further, the thin walled tubes 2 are comprised appropriately of fibers with capillary flow ducts, as is known in the art. However, larger dimensions for the thin walled tubes 2 are also possible.

Each of the frame assemblies 1 is preferably of an elongated and substantially rectangular shape. Consequently, the assembled apparatus will have a substantially parallelepipedic shape which is most suitable from a point of view of storage and transport, both of the frame assemblies 1 before assembly and of the completely assembled apparatus of the present invention.

The stack of frame assemblies 1 with the fiber clusters 2 supported therein are held together between a pair of clamping plates 5 and 6. These clamping plates 5 and 6 are in turn held together in a compressed state between side clamping rails 7 and 8 which extend along the elongated sides of the apparatus. In fact, each of the individual frame assemblies 1 are tightly pressed together and are provided with gaskets 9 which are arranged between each of the individual frame assemblies 1 around the outer periphery thereof. Additionally, gasket seals 9 are provided between the uppermost frame assembly 1 and the upper clamping plate 5, and between the lowermost frame assembly 1 and the lower clamping plate 6, as best seen in FIG. 4. An evenly distributed pressure over the gasket seals 9 is achieved by the clamping rails 7, 8 so that the gaskets 9 serve to seal the interior of the frame assemblies 1 in order to maintain the fluid which is conducted therethrough from contacting the fluid being flowed through the tubes or fibers 2. This sealing is also aided by the blocks 3, 4 of sealing compound which retain the ends of the fibers or tubes 2 in the frame assemblies 1. Therefore, the contact chambers 19 within each of the frame assemblies 1 are effectively sealed from the tubular membranes or fibers 2 to prevent any cross contact of the two fluids.

End fittings 10 and 11 serve to close the ends of the stacked frame assemblies 1. These end fittings 10 and 11 contain an inlet 12 and an outlet 13 which are used for the supply and for the withdrawal respectively of a first fluid, such as for example blood, when the apparatus is used as an artificial kidney for purification of blood. As best seen in FIG. 5, the blood is conducted via the openings 14 and 15 from the inlet 12 into a plurality of distributing chambers 16 arranged in the end fitting 10. From there, the blood is conducted into the mouths or open ends of the thin walled tubes or fibers 2 which are open towards the distributing chambers 16.

As best seen in FIG. 5, the end fitting 10 is provided with a component part 10b which is adapted to press a gasket 17 against the block 3 of sealing compound around the open ends of the fibers 2. The gasket 17 is arranged between the end fitting part 10b and the block 3 of sealing compound of each of the frame assemblies 1 to surround the open ends of all of the tubular fibers 2 of each frame assembly 1. In this way, the blood which is conducted into the various distribution chambers 16 is caused to flow inside the closed sealing curves surrounding the open ends of the tubular fibers 2 of each frame assembly 1 provided by the gasket 17 and from there into the open ends of the tubular fibers 2. Thus, the blood in each of the distribution chambers 16 is effectively distributed only to the tubular fibers 2 communicating therewith inside of the gasket seal 17. This gasket 17 also serves to effectively seal the fluid being conducted through the thin walled tubes 2 from the fluid being conducted through the contact chambers 19 of the frame assemblies 1.

Although not shown, collecting chambers similar to the distribution chambers 16 are provided for the outlet 13 by the end fitting component 11 at the opposite end of the stacked frame assemblies 1. Also, a similar gasket seal 17 is provided between the end fitting part 11b and the stacked frame assemblies 1.

The frame assemblies 1 are formed with an intermediate wall or web 1a (see FIG. 4) which divides the space inside the frame assemblies 1 into a contact chamber 19 which is intended to accomodate the cluster of tubes or fibers 2 and an intermediate flow channel or chamber 20. The intermediate flow channel or chamber 20 is further defined by cover-like intermediate wall or plate 18 which is disposed between each of the individual frame assemblies 1 in the stack, to separate the intermediate flow channel 20 from the thin walled tubes 2 of an adjacent frame assembly 1. This arrangement thus provides the capability of a pure countercurrent flow between the dialysis liquid flowing through the contact chambers 19 around the plurality of tubes or fibers 2 and the blood which is conducted through the interior of the fibers 2, as described in copending U.S. patent application Ser. No. 713,408 filed Aug. 11, 1976. At the same time, a very simple form for the frame assemblies 1 and the associated intermediate cover-like plate 18 can be obtained from the point of view of mass manufacture of the components. This in turn provides the capability of increasing or decreasing the number of frame assemblies 1 utilized in the selective separation apparatus without the need of requiring a different manufacturing apparatus for each different size selective separation apparatus.

When the apparatus is used as an artificial kidney, the dialysis liquid is introduced via an inlet 21 located in the end fitting 11 and a duct 22 in the bottom clamping plate 6 into the first contact chamber 19' of the bottom frame assembly 1. From this contact chamber 19', the dialysis liquid passes along the outer surfaces of the tubular membranes 2 disposed in chamber 19' in a pure countercurrent flow arrangement to the end of the contact chamber 19' adjacent the end fitting 10. From there, the dialysis liquid passes via an opening 23 provided in the intermediate cover plate 18 into the first intermediate flow channel 20', and flows therethrough in a direction toward end fitting 11. The dialysis liquid then passes through an opening 24 provided in the intermediate wall 1a of the second frame assembly 1 into the second contact chamber 19" which is provided with a second cluster of fibers 2. In a similar manner, the dialysis liquid then passes via an opening 25 in the second intermediate plate 18 into the second intermediate flow channel 20", etc., continuing in a zigzag fashion throughout the contact chambers 19 and intermediate flow channels 20 of the frame assemblies 1 until the dialysis liquid reaches the uppermost frame assembly 1 adjacent the top cover plate 5. From there, the dialysis liquid is conducted through an outlet duct 26 in the cover plate 5 and from there, through the outlet 27 in the end fitting 10. Thus, it is seen that the arrangement of the frame assemblies 1 having the contact chambers 19 thereof connected in series between the inlet 21 and the outlet 27 provides for a compact construction without the necessity of any nipples projecting in different directions, as has been customary in similar constructions of the prior art.

It is to be noted that each of the frame assemblies 1 is substantially identical to the other frame assemblies 1 and may be easily stacked one on top of the other to provide the desired construction. In this regard, it is to be noted that only the lower most frame assembly 1 which communicates with the duct 22 in the cover plate 6 is not provided with an intermediate wall or web 1a. Rather, this lower most frame assembly 1 has its contact chamber 19' communicating directly with the duct 22.

Further, it is to be noted that the openings 23, 25, etc. in the cover plates 18 may be provided by having the cover plates 18 terminate a short distance from the ends of the contact chambers 19 formed by the blocks 3 of sealing compound adjacent end fitting 10. Similarly, the openings 24 in the intermediate webs 1a integrally formed on the frame assemblies 1, may be provided by having the webs 1a terminate a short distance from the sealing blocks 4 adjacent the end fitting 11 retaining the ends of the tubular membranes 2. Alternatively, the flow openings 23, 24, 25 for the intermediate flow channels 20 could be formed by flow holes in the intermediate walls 1a and plates 18.

It is further to be noted that inlet and outlet ducts 22, 26 provided in the upper and lower clamping plates 6, 5 respectively also contribute to the compact construction of the apparatus of the present invention. Such ducts 22, 26 may be arranged without having to make the clamping plates 6 and 5 substantially thicker to provide separate inlets and outlets which would otherwise require that the end fittings 10, 11 also be made larger.

The inlets 12 and 21 and the outlets 13 and 27 for the two fluids are each provided with means for retaining flexible tubes for the supply and withdrawal of the two fluids, i.e., the blood and dialysis liquids respectively. These means for retaining the flexible tubes may consist, for example, as shown in the drawings, of threaded connectors for the blood tubes or snap couplings for the tubes for dialysis liquid. One example of such snap couplings that has been found to be useful is described in Swedish Pat. No. 396,458.

The end fittings 10 and 11 of the apparatus shown in the drawings, are each comprised of two parts, 10a and 10b, and 11a and 11b, respectively, the components or parts 10b and 11b being clamped as inserts inside the components of parts 10a and 11a. This clamping force may be obtained in any optional manner, for example with snap devices similar to those which retain the clamping rails 7 and 8 on the clamping plates 5 and 6. Alternatively, the end fittings 10 and 11 could simply be pressed together by an external mechanical force while they are welded and/or glued into their respective places in the apparatus.

While in the preferred embodiment the end fittings 10 and 11 have been designed to be separate components, i.e., apart from the frame assemblies 1 as well as from the clamping plates 5 and 6 and the clamping rails 7 and 8, it of course should be realized that such end fittings 10 and 11 could be designed to be integral with some other component, such as for example, the clamping plates 5, 6, and/or clamping rails 7, 8.

The various components of the apparatus of the present invention may be made of plastics or other readily combustible materials which can be easily destroyed after use. This is most important in medical applications so as to avoid the risk of contamination, infection, etc.

Thus, it is seen that according to the present invention, the separating apparatus comprises a plurality of separate frame assemblies 1 each of which defines separate contact chambers 19 for a second fluid. A plurality of tubular semi-permeable membranes 2 are provided in each of the contact chambers 19. The separate frame assemblies 1 and tubular membranes 2 are stacked together with the contact chambers 19 being arranged in side by side relationship and held there in place by clamping devices 5, 6, 7, 8. Inlet means 12 and outlet means 13 for the first fluid are provided, peferably in end fittings 10 and 11. Further, inlet means 21 and outlet means 27 for the second fluid are provided, also preferably in the end fittings 10 and 11. The first fluid is adapted to be conducted through the semi-permeable membranes 2 whereas the second fluid is adapted to be conducted through the contact chambers 19 connected in series to provide for flow to the second fluid from the inlet 21 to the outlet 27. It is during this conduction through the individual contact chambers 19 in which the second fluid surrounds the semi-permeable membranes 2 containing the first fluid that the selective separation of the matter between the two fluids is achieved through the semi-permeable membranes 2.

While the preferred embodiment of the present invention has been described and shown, it will be understood that such is merely illustrative and the changes may be made without departing from the scope of the invention as claimed. Thus, the individual details shown may vary within wide limits without exceeding the cope of the invention. For other similar types of construction containing other details which could be applied to the construction of the apparatus in accordance with the present invention, reference should be made to copending U.S. patent application Ser. No. 951,313 and 951,314 filed on even date herewith.

What is claimed is:

1. Apparatus for selectively separating matter between a first fluid and a second fluid through semipermeable membranes, said apparatus comprising:

a plurality of individual and stackable frame assemblies each of which defines a separate contact chamber for said second fluid;

a plurality of elongated tubular semi-permeable membranes for said first fluid for each of said separate frame assemblies, each of said pluralities of tubular semi-permeable membranes being longitudinally disposed in said contact chamber of one of said separate frame assemblies so that said second fluid substantially surrounds said tubular membranes as it passes through said contact chamber, and each of said tubular membranes being adapted to conduct a portion of said first fluid longitudinally therethrough;

said individual frame assemblies being arranged in a stacked relationship so that said contact chambers of said stacked frame assemblies are arranged in side by side stacked relationship, said individual frame assemblies being separate and unconnected from one another prior to assembly in said stacked relationship;

clamping means for clamping together said stacked frame assemblies to hold said individual frame assemblies in said stacked relationship;

each of said frame assemblies including barrier means between said contact chamber of each said frame assembly and said contact chamber of the adjacent frame assembly for separating said contact chambers of said stacked frame assemblies from one another;

each of said frame assemblies having communication means for providing fluid communication for said second fluid between said contact chambers of said stacked frame assemblies in a manner so that said second fluid is conducted through each of said contact chambers substantially along the longitudinal length of said elongated tubular membranes therein;

sealing means for sealing said tubular membranes from said contact chambers so that there is no contact between said first fluid and said second fluid;

separate first inlet means for introducing at least a portion of said first fluid into each of said tubular membranes;

separate first outlet means for withdrawing said first fluid from said tubular membranes;

separate second inlet means for inroducing said second fluid into at least one of said contact chambers; and separate second outlet means for withdrawing said second fluid from at least one of said contact chambers so that said second fluid is conducted through said contact chambers in contact with said pluralities of tubular membranes from said second inlet to said second outlet to selectively separate the matter between said first fluid and said second fluid.

2. The apparatus of claim 1 wherein said plurality of frame assemblies include a first frame assembly and a second frame assembly adjacent to one another in said stack of frame assemblies, wherein said barrier means of said first frame assembly comprises an intermediate wall dividing said first frame assembly into said contact chamber in which one of said plurality of tubular membranes is disposed and an intermediate flow channel in which none of said tubular membranes are disposed, said intermediate flow channel of said first frame assembly being arranged between said contact chamber of said first frame assembly and said contact chamber of said second frame assembly; and wherein said communication means for said first frame assembly includes an opening in said intermediate wall for providing fluid communication between said contact chamber of said first frame assembly and said intermediate flow channel, and wherein said communication means for said second frame assembly provides fluid communication between said intermediate flow channel and said contact chamber of said second frame assembly.

3. The apparatus of claim 2 wherein said barrier means of said first frame assembly further comprises an intermediate plate member disposed between said first frame assembly and said second frame assembly and spaced from said intermediate wall of said first frame assembly to define said intermediate flow channel between said intermediate wall and said intermediate plate member, and wherein said fluid communication means for said second frame assembly includes an opening in said intermediate plate member between said intermediate flow channel and said contact chamber of said second frame assembly.

4. The apparatus of claim 3 wherein said opening in said intermediate wall is at the opposite end of said stacked frame assemblies from said opening in said intermediate plate member so that said second fluid introduced into said intermediate flow channel is adapted to flow along substantially the entire length of said intermediate flow channel.

5. The apparatus of claim 1 further including first and second end fittings for said plurality of frame assemblies clamped in stacked relationship, at least one of said first and second inlet means being in said first end fitting and at least one of said first and second outlet means being in said second end fitting.

6. The apparatus of claim 5 wherein said first inlet means is in said first end fitting and wherein said first outlet means is in said second end fitting.

7. The apparatus of claim 6 wherein said second inlet means is in said second end fitting and wherein said second outlet means is in said first end fitting.

8. The apparatus of claim 1 wherein said contact chambers of said frame assemblies each have a first end and a second end, said frame assemblies being stacked so that said first ends of said contact chambers are at a first end of said stacked frame assemblies and said second ends of said contact chamber are at a second end of the stacked frame assemblies; and wherein each of said tubular semi-permeable membranes extend from said first end of said contact chambers to said second end of said contact chambers.

9. The apparatus of claim 8 wherein said first fluid is adapted to flow through said tubular membranes in a direction from said first end to said second end; wherein said barrier means define intermediate flow channels for said second fluid between said contact chambers of adjacent frame assemblies, and wherein said communication means include flow openings in said barrier means adjacent said first and second ends of said contact chambers so that said second fluid is adapted to flow through each of said contact chambers in a direction from said second end to said first end, and is adapted to flow through said intermediate flow channels in a direction from said first end to said second end.

10. The apparatus of claim 9 wherein said barrier means comprise first and second intermediate walls between said contact chambers of adjacent frame assemblies, each of said first and second intermediate walls extending substantially from said first end to said second end of said stacked frame assemblies, and wherein said flow openings in said barrier means comprise a first opening in said first intermediate wall adjacent said first end and a second opening in said second intermediate wall adjacent said second end.

11. The apparatus of claim 10 wherein one of said frame assemblies on the outside of said stack of frame assemblies is a first frame assembly, wherein the other of said frame assemblies on the outside of said stack of frame assemblies is a second frame assembly, wherein said second inlet means communicates with said second end of said contact chamber of said first frame assembly, wherein said second outlet means communicates with said first end of said contact chamber of said second frame assembly; and wherein said first and second intermediate walls are arranged in pairs between said contact chambers of adjacent frame assemblies with said first intermediate wall of said pairs being disposed towards said first frame assembly and said second intermediate wall of said pair being disposed towards said second frame assembly so that said second fluid is adapted to be conducted through said stacked frame assemblies from said first frame assembly to said second frame assembly, said second fluid being conducted through each of said contact chambers from said second end to said first end and through each of said intermediate flow channels from said first end to said second end.

12. The apparatus of claim 11 wherein said second intermediate walls are integrally formed on each of said frame assemblies and wherein said first intermediate walls comprise a separate intermediate plate disposed between adjacent frame assemblies in said stack of frame assemblies.

13. The apparatus of claim 12 wherein said means for clamping said plurality of frame assemblies together comprises first and second cover plates positioned outside of said first and second frame assemblies respectively of the stacked frame assemblies, and first and second clamping rails positioned along the sides of said stacked frame assemblies to clamp said first and second cover plates together to hold said frame assemblies therebetween.

14. The apparatus of claim 10 wherein said sealing means further includes a gasket seal between adjacent frame assemblies of said stacked frame assemblies for sealing said contact chambers of said frame assemblies.

15. The apparatus of claim 14 further including first and second end fittings for said first and second ends of said stacked frame assemblies, said first inlet means being located in said first end fitting and said first outlet means being located in said second end fitting.

16. The apparatus of claim 15 wherein said sealing means further comprises blocks of sealing compound for sealing the ends of said plurality of tubular membranes at said first and second ends of said contact chambers, said blocks of sealing compound being retained by said frame assemblies to support said plurality of tubular membranes in said contact chambers with the ends of said tubular membranes being open at the ends of said frame assemblies.

17. The apparatus of claim 16 wherein said sealing means further comprises end gasket seals for each of said ends of each of said frame assemblies, said end gasket seals being disposed between said ends of said frame assemblies and said end fittings, and each of said end gasket seals engaging the open ends of said plurality of tubular membranes supported by said frame assembly.

18. The apparatus of claim 13 wherein said first end fitting includes means for distributing said first fluid and said second end fitting includes means for collecting said first fluid so that said first fluid is adapted to be evenly divided between said pluralities of tubular membranes of said frame assemblies as said first fluid flows therethrough.

19. Apparatus for selectively separating matter between a first fluid and a second fluid through semi-permeable membranes, said apparatus comprising:
a plurality of individual and stackable frame assemblies each of which defines a separate contact chamber for said second fluid;
a plurality of elongated tubular semi-permeable membranes for said first fluid for each of said separate frame assemblies, each of said pluralities of tubular semi-permeable membranes being longitudinally disposed in said contact chamber of one of said separate frame assemblies so that said second fluid substantially surrounds said tubular membranes as it passes through said contact chamber, and each of said tubular membranes being adapted to conduct a portion of said first fluid longitudinally therethrough;

said individual frame assemblies being arranged in a stacked relationship so that said contact chambers of said stacked frame assemblies are arranged in side by side stacked relationship, said individual frame assemblies being separate and unconnected from one another prior to assembly in said stacked relationship;

clamping means for clamping together said stacked frame assemblies to hold said individual frame assemblies in said stacked relationship;

each of said frame assemblies including barrier means between said contact chamber of each of said frame assemblies and said contact chamber of the adjacent frame assembly for separating said contact chambers of said stacked frame assemblies from one another;

each of said frame assemblies having communication means for providing fluid communication for said second fluid between said contact chambers of said stacked frame assemblies in a manner so that said second fluid is conducted through each of said contact chambers substantially along the longitudinal length of said elongated tubular membranes therein;

sealing means for each of said frame assemblies for sealing the ends of said tubular membranes from said contact chambers, said sealing means cooperating with one another and with said frame assemblies when said frame assemblies are in said stacked arrangement so that there is no contact between said first fluid and said second fluid;

separate first inlet means for introducing at least a portion of said first fluid into each of said tubular membranes;

separate first outlet means for withdrawing said first fluid from said tubular membranes;

separate second inlet means for introducing said second fluid into at least one of said contact chambers; and separate second outlet means for withdrawing said second fluid from at least one of said contact chambers so that said second fluid is conducted through said contact chambers in contact with said pluralities of tubular membranes from said second inlet to said second outlet to selectively separate the matter between said first fluid and said second fluid.

* * * * *